United States Patent [19]

Jones

[11] Patent Number: 5,780,178
[45] Date of Patent: Jul. 14, 1998

[54] SCANDIA, YTTRIA-STABILIZED ZIRCONIA FOR ULTRA-HIGH TEMPERATURE THERMAL BARRIER COATINGS

[75] Inventor: Robert L. Jones, Fairfax, Va.

[73] Assignee: The United States of America as represented by the Secretary of the Navy, Washington, D.C.

[21] Appl. No.: 741,006

[22] Filed: Oct. 31, 1996

[51] Int. Cl.⁶ ..................................... F01D 11/08
[52] U.S. Cl. .................. 428/697; 428/699; 428/701; 428/702
[58] Field of Search ................... 428/697, 699, 428/701, 702

[56] References Cited

U.S. PATENT DOCUMENTS

| | | | |
|---|---|---|---|
| 4,360,598 | 11/1982 | Otagiri et al. | 501/103 |
| 4,913,961 | 4/1990 | Jones et al. | 428/332 |
| 4,939,107 | 7/1990 | Ketcham | 501/103 |
| 5,007,992 | 4/1991 | Weber | 204/59 R |
| 5,030,601 | 7/1991 | Michel et al. | 501/103 |
| 5,047,373 | 9/1991 | Ketcham | 501/103 |
| 5,104,832 | 4/1992 | Michel et al. | 501/103 |
| 5,288,205 | 2/1994 | Jones | 415/200 |
| 5,290,332 | 3/1994 | Chatterjee et al. | 65/18.1 |
| 5,358,913 | 10/1994 | Chatterjee et al. | 501/103 |
| 5,385,874 | 1/1995 | Renlund et al. | 501/103 |
| 5,418,060 | 5/1995 | Jones | 428/334 |
| 5,532,057 | 7/1996 | Jones | 428/334 |

OTHER PUBLICATIONS

Ciacchi et al "The System $Y_2O_3$–$Sc_2O_3$–$ZrO_2$: Phase Characterization by XRD, TEM and Optical Microscopy" J. Europ. Cer. Soc. 7 (1991), 185–195.

Terauchi et al, "High Ionic Conductivity and High Fracture Strength of Cubic Zirconia $(Y_{0.16-x}Sc_x)Zr_{0.84}O_{1.92}$/Alumina Composites" Material Letters 23 (1995) 273–275.

Ciacchi et al, "The System $Y_2O_3$–$Sc_2O_3$–$ZrO_2$: Phase Stability and Ionic Characterization" J. Europ. Cer Soc. 7 (1991), 196–205.

Primary Examiner—Archene Turner
Attorney, Agent, or Firm—Thomas E. McDonnell; Ralph T. Webb

[57] ABSTRACT

A composite structure includes a self-supporting substrate and a thermal barrier coating of zirconia stabilized with scandia and yttria. A method of protecting the surface of a self-supporting substrate from degradation caused by exposure to temperatures above 1200° C. includes the step of applying to the surface a coating of zirconia stabilized with scandia and yttria.

9 Claims, 5 Drawing Sheets

SCANDIA, YTTRIA-STABILIZED ZIRCONIA FOR ULTRA-HIGH TEMPERATURE THERMAL BARRIER COATINGS

BACKGROUND OF THE INVENTION

1. Field of the Invention

The invention relates to composite structures and, more particularly to composite structures with thermal barrier coatings of zirconia stabilized with scandia and yttria.

2. Description of the Related Art

Thermal barrier coatings (TBCs) are widely used in the gas turbine engine industry to protect metal engine components such as combustion chambers and turbine blades from high temperatures and thereby to increase engine component life and to improve engine efficiency. Because engine power and efficiency increase with gas operating temperatures, the search is ongoing for metal and coating compositions that can withstand higher temperatures.

Zirconia ($ZrO_2$) is a ceramic that has excellent heat insulating properties that are desirable in a thermal barrier coating. However, pure or unstabilized zirconia undergoes a catastrophic tetragonal-to-monoclinic phase change when subjected to thermal cycling through the range of 1000°–1100° C. This phase transformation results in a change in volume of zirconia and can cause disastrous flaking and deterioration of a thermal barrier coating containing zirconia. To avoid the phase transformation and consequent flaking and deterioration, zirconia can be combined with stabilizing oxides such as yttria ($Y_2O_3$), calcia (CaO), magnesia (MgO), ceria ($CeO_2$), scandia ($Sc_2O_3$) (see U.S. Pat. No. 4,913,961, incorporated herein by reference in its entirety) and india ($In_2O_3$) (see U.S. Pat. Nos. 5,288,205; 5,418,060 and 5,532,057, each incorporated herein by reference in its entirety). When zirconia containing a stabilizing oxide such as yttria, scandia or india is heated into the cubic or liquid phase and quenched rapidly, a metastable tetragonal t'phase is formed that resists tetragonal-monoclinic transformations during subsequent thermal cycling. The stabilized zirconia can then be used in a thermal barrier coating. The most commonly used stabilizing oxide for thermal barrier coatings is yttria, which is commonly added to zirconia in the amount of 6–8 wt %.

A disadvantage of yttria-stabilized zirconia in thermal barrier coatings is that the protective t'phase breaks down at ultra-high temperatures (temperatures above 1200° C.). Equilibrium tetragonal t and cubic f phases are formed at these temperatures, and upon cooling, the tetragonal t phase transforms to the monoclinic m phase much the same as it does in unstabilized zirconia. This phase instability of yttria-stabilized coatings at ultra-high temperatures is and will continue to be a major drawback, especially as high efficiency engines are developed that operate with coating surface temperatures of 1400° C. or higher.

A further disadvantage of yttria-stabilized zirconia in thermal barrier coatings is that the coatings are easily damaged by exposure to hot corrosive fuel contaminants such as vanadium- and sulfur-containing compounds. Such exposure may happen, for example, in wartime when high qualtity fuel is scarce. When the yttria in a yttria-stabilized zirconia thermal barrier coating reacts with vanadium impurities in fuel, the coating becomes yttria-depleted and destabilized.

Scandia-stabilized zirconia has been tested as an alternative to yttria-stabilized zirconia in thermal barrier coatings. As described in U.S. Pat. No. 4,913,961, scandia-stabilized zirconia is much more resistant to damage from exposure to vanadium- and sulfur-containing compounds than yttria-stabilized zirconia.

In the field of thermal barrier coatings, improvements in the performance of a coating can have a large economic impact by allowing more efficient gas turbine engines to be designed and built. Therefore, it would be desirable to have a thermal barrier coatings with even better phase stability at ultra-high temperatures than what can be obtained with yttria-stabilized zirconia or scandia-stabilized zirconia.

SUMMARY OF THE INVENTION

It is an object of this invention to provide a thermal barrier coating of stabilized zirconia with an improved phase stability (in comparison with known zirconia-containing thermal barrier coatings) when exposed to temperatures above 1200° C.

This and other objects of the invention are achieved by providing a composite structure made up of a self-supporting substrate having a thermal barrier coating of zirconia stabilized with a combination of scandia and yttria. The zirconia thermal barrier coating stabilized with a combination of both scandia and yttria shows a markedly improved ability to maintain phase stability, to retain the tetragonal (t') phase structure when exposed to temperatures above 1200° C. and to not undergo a tetragonal-to-monclinic phase transition upon cooling, in comparison with thermal barrier coatings containing zirconia stabilized with either scandia alone or yttria alone.

BRIEF DESCRIPTION OF THE DRAWINGS

The following detailed description will be more fully understood in view of the accompanying drawings.

DETAILED DESCRIPTION OF THE INVENTION

Figure 1:
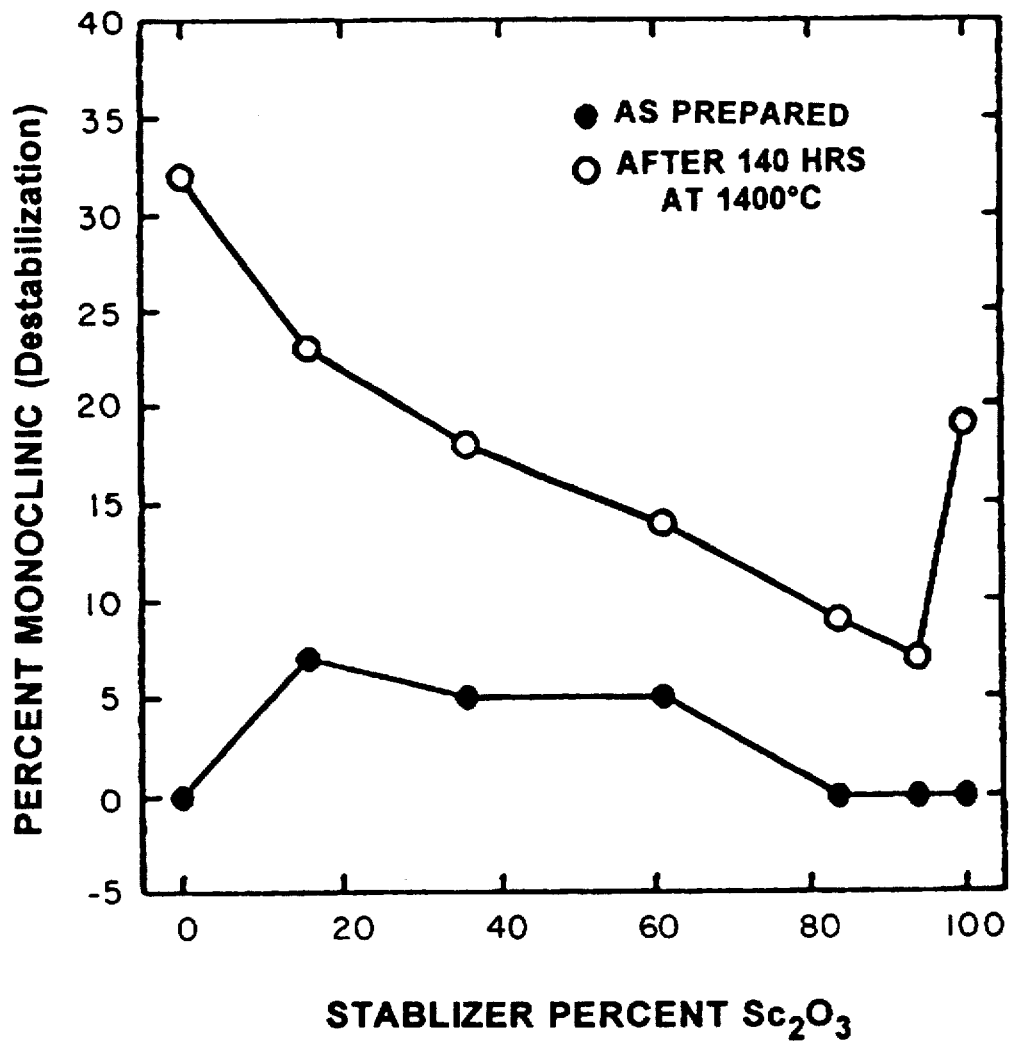
FIG. 1 is a graph showing the monoclinic formation for a series of scandia- and/or yttria-stabilized zirconia powders. The graph shows the trend of monoclinic formation as a function of the relative amount of $Sc_2O_3$ in the stabilizer, for powders as prepared and after heating at 1400° C. for 140 hours.
Figure 2A:
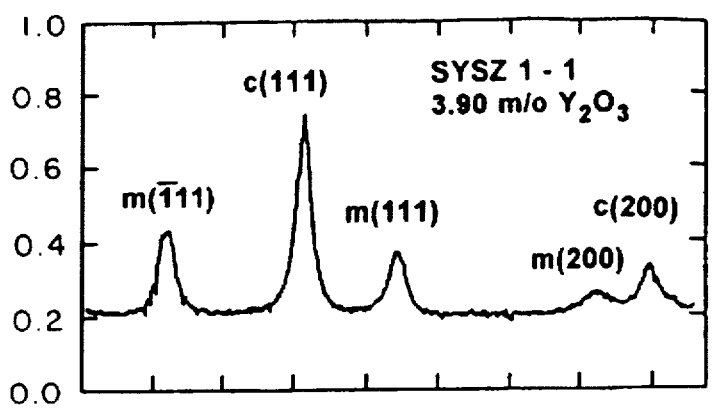
FIG. 2 (a)–(d) are a series of X-ray diffraction patterns from the 27°–36° 2θ region for selected compositions from a first series (Series 1) of scandia- and/or yttria-stabilized powders after heating at 1400° C. for 140 hours.
Figure 2B:
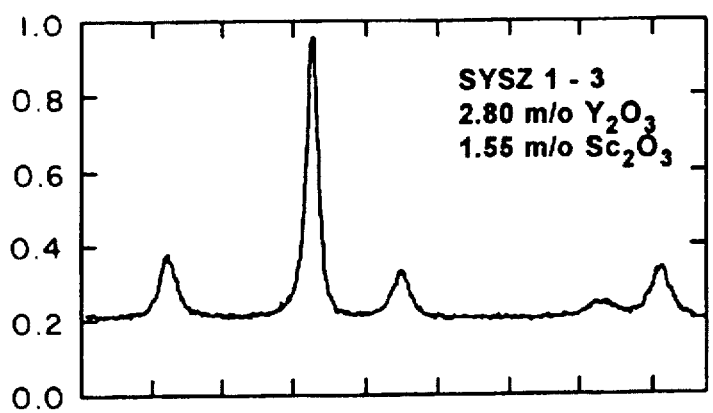
Figure 2C:
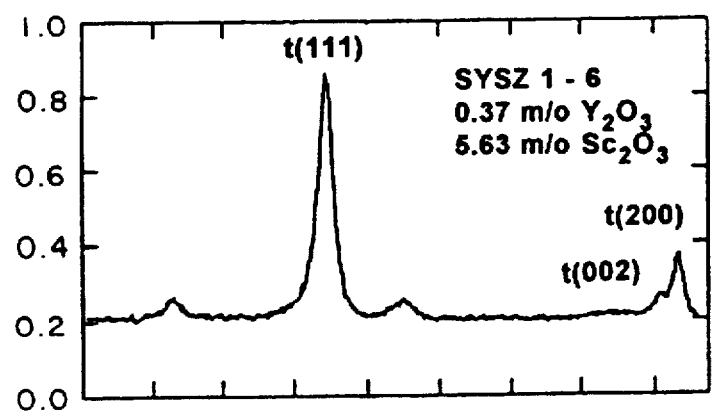
Figure 2D:
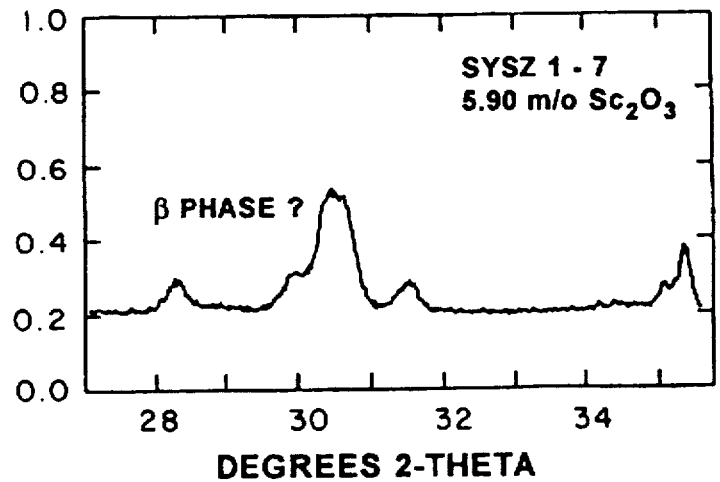
Figure 3A:
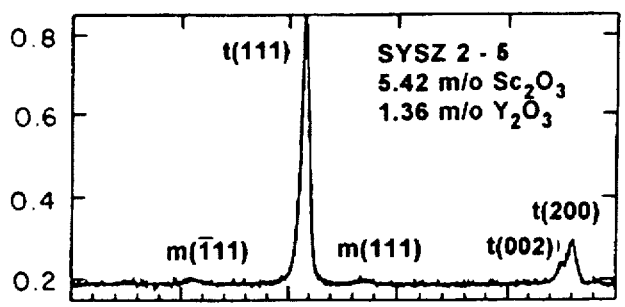
FIG. 3 (a)–(e) are a series of X-ray diffraction patterns from the 26°–36° 2θ region for a second series (series 2) of scandia- and/or yttria-stabilized powders after heating at 1400° C. for 140 hours.
Figure 3B:
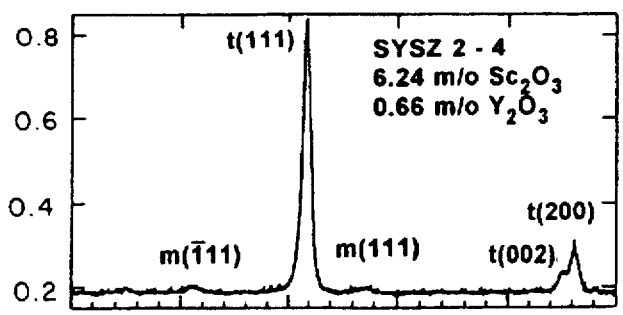
Figure 3C:
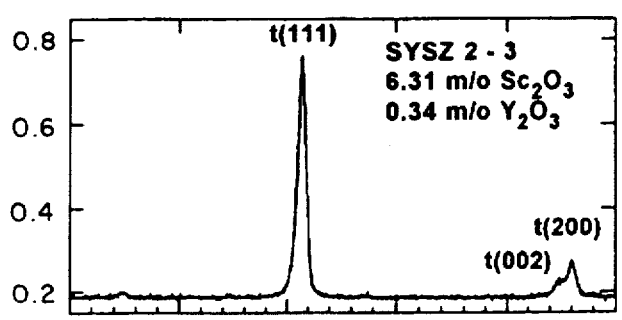
Figure 3D:
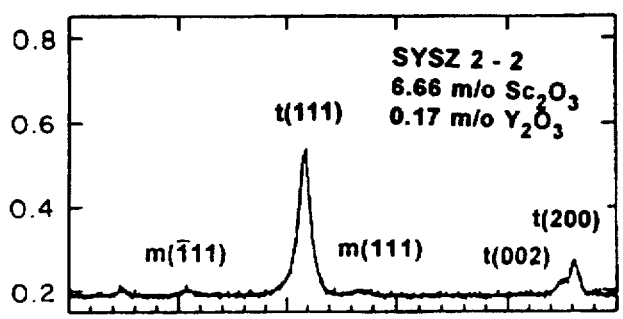
Figure 3E:
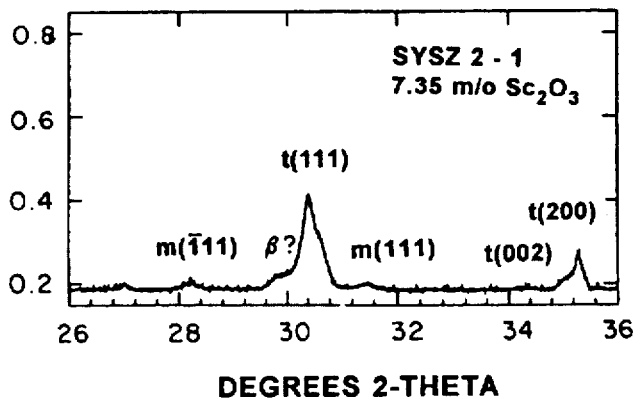

The invention relates to a composite structure comprising a self-supporting substrate and a thermal barrier coating on the substrate of zirconia stabilized with scandia and yttria (zirconia stabilized with scandia and yttria is also referred to as "scandia, yttria-stabilized zirconia" or "SYSZ") When the outer surface of the thermal barrier coating of scandia, yttria-stabilized zirconia is exposed to temperatures above 1200° C., the scandia, yttria- stabilized zirconia is much less likely than either scandia-stabilized zirconia or yttria-stabilized zirconia to undergo destructive tetragonal-to-monoclinic phase transformations upon subsequent cooling. Preferably, at least 90% by volume of the scandia, yttria- stabilized zirconia is in the quenched-in metastable tetragonal (t') phase.

The present invention further relates to a method of protecting the surface of a self-supporting structure from degradation caused by exposure to temperatures above 1200° C. comprising the step of applying to said surface a coating of zirconia stabilized with scandia and yttria.

When the outer surface of a thermal barrier coating of scandia, yttria- stabilized zirconia is exposed to hot fuel contaminants such as vanadium-containing compounds, the coating resists corrosion and destabilization much better than a coating of yttria-stabilized zirconia and performs as well as a coating of scandia-stabilized zirconia.

The composite structure of the present invention is prepared by first preparing a ceramic of zirconia ($ZrO_2$) stabilized with scandia ($Sc_2O_3$) and yttria ($Y_2O_3$), and then applying the scandia, yttria- stabilized zirconia ceramic as a thermal barrier coating to a substrate that is to be protected from high temperatures and corrosive fuel contaminants. The zirconia ceramic used in the present invention may include some hafnia ($HfO_2$) in the amount that naturally associates with zirconia (approximately 2 wt %). It is not necessary to purify zirconia to remove the naturally occuring hafnia, and in calculating mole or weight percentages of ingredients in the thermal barrier coating, the hafnia can be figured in with the zirconia. The zirconia may also include the trace materials $SiO_2$, $TiO_2$, $Al_2O_3$, MgO, CaO, $Fe_2O_3$, U, Th and $Na_2O$, usually found in zirconia in amounts below about 0.05 wt %.

The surprising improvement in phase stability obtained with a thermal barrier coating of scandia, yttria- stabilized zirconia is found especially when the amounts of scandia and yttria in the coating fall within certain ranges described below. In describing the amounts of scandia and yttria in the thermal barrier coating, it is helpful, for comparison purposes, to give the relative amounts of scandia and yttria in the coating by expressing the amount of yttria or the amount of scandia as a percentage (by mole) of combined amount of scandia and yttria. Then, the combined amount of scandia and yttria is expressed as a percentage (by mole) of the total composition of the coating (that is, of the combined amount of scandia, yttria and zirconia).

The improvement in phase stability is found especially when the combined amount of scandia and yttria about 4–10 mole-percent of the thermal barrier coating and when the amount of yttria in the thermal barrier coating is about 1–70 mole-percent of the combined amount of scandia and yttria (and scandia is about 99–30 mole-percent), or, more particularly, when the amount of yttria is about 5–20 mole-percent of the combined amount of scandia and yttria (and scandia is about 95–80 mole percent). The improvement is greatest when the combined amount of scandia and yttria in the thermal barrier coating is about 6–8 mole-percent of the thermal barrier coating and when the amount of yttria in the thermal barrier coating is about 5–15 mole-percent of the combined amount of scandia and yttria (and scandia is about 95–85 mole percent).

The scandia, yttria- stabilized zirconia ceramic may be formed by any means known in the art for combining zirconia with a stabilizer. Preferably the scandia, yttria-stabilized zirconia ceramic is formed by a sol-gel process. In the sol-gel process, the desired amount of zirconium basic carbonate is added to nitric acid, preferably about 8 molar nitric acid in the proportion of about 1 mole nitric acid to 1 mole zirconium, to form a zirconium aquo-sol. To this mixture is added the desired amount of scandium in the form of an aqueous scandium nitrate solution (preferably in a concentration of about 0.13 parts oxide/1 part water) and the desired amount of yttrium in the form of yttrium nitrate (preferably in a concentration of about 0.22 parts oxide/1 part water) to form a feed mixture. The feed mixture is immediately added, while stirring, to a mixture of a surfactant (for example, Span 80®, a sorbitane monooleate surfactant made by Fluka Chemical Corp., 980 South 2nd St., Ronkonkoma, N.Y. 11779-7238.) and trichloroethylene. The combined mixture is sparged with ammonia gas for about 20 minutes until the pH is about 8.5 to form spherical gel particles. The gel particles are separated by filtration or by decanting, dried, and then heated, preferably for about 2 hours at about 850°–900° C. During the heating, the scandium nitrate, yttium nitrate and zirconium are converted into $Sc_2O_3$, $Y_2O_3$, and $ZrO_2$. This process gives excellent chemical homogeneity of the individual powder particles and good uniformity of particle size without additional processing.

Alternatively, the scandia, yttria- stabilized zirconia ceramic may be formed by combining acid solutions of scandia and yttria, (for example, scandia and yttria dissolved in HCl), with a zirconia salt (for example, $ZrOCl_2$), neutralizing the solution (with, for example, $NH_4OH$) to precipitate the mixed oxide ceramic precursor and then recovering the precipitate. The precipitate is calcined, pressed and fired to form a dense ceramic material. The density of the ceramic can be increased by isostatic pressing, hot pressing or any other means used to form ceramics.

The scandia, yttria- stabilized zirconia ceramic can be applied to a substrate to be protected from ultra-high temperatures and from corrosive fuel contaminants by any method known in the art for applying a thermal barrier coating to a substrate. Applying the scandia, yttria- stabilized zirconia ceramic to the surface of a substrate forms the composite structure of the present invention. Methods for applying a thermal barrier coating to a substrate include, but are not limited to, air plasma-spraying (APS) and electron beam-physical vapor deposition (EB-PVD). Applying scandia, yttria-stabilized zirconia to a substrate by air plasma spraying or electron beam-physical vapor deposition produces a coating in which at least 90% of the zirconia is in the t'phase.

The substrate can be any self-supporting structure and is preferably a metal or a ceramic. Various ceramics and metals can serve as the substrate to be coated with scandia, yttria-stabilized zirconia according to the present invention. Suitable metals include structural alloys such as steels and aluminum alloys, and high temperature Ni-based superalloys.

The composite structure of the present invention is particularly useful for combustion engine components such as gas turbine engine vanes or blades that have surfaces that are subjected to ultra-high operational temperatures (above 1200° C.). The power and efficiency of gas turbine engines increase significantly as turbine inlet gas temperatures increase. Therefore, engine manufacturers are continually seeking improved superalloy substrates and thermal barrier coatings that can withstand higher temperatures.

Accordingly, the present invention includes a combustion engine having metal surfaces coated with a thermal barrier coating of zirconia stabilized with scandia and yttria. The thermal barrier coating provides improved resistance to degradation caused by exposure to temperatures above 1200° C. The invention further includes a method of protecting the surface of a combustion engine from degradation caused by exposure to temperatures above 1200° C. comprising the step of applying to the surface a coating of zirconia stabilized with scandia and yttria.

The thermal barrier coating can be any practical thickness as is commonly used in constructing particular pieces of equipment. The coating can be as thick as ¼ inches for thermal barrier use in large diesel engines.

The improved ability of scandia, yttria- stabilized zirconia to maintain phase stability, to retain the tetragonal (t') phase structure when exposed to temperatures above 1200° C. and to not undergo a tetragonal-to-monclinic phase transition upon cooling is demonstrated in the following examples, which are given by way of illustration and not by way of limitation. In particular, the high-temperature aging experiments have been done on zirconia ceramic powders, rather than on composite structures as defined by the present invention. The method described herein is based on an accepted procedure for screening candidate compositions for thermal barrier coatings, with an improvement being that candidate compositions are aged for 140 or hours or more rather than for the industry standard of only 100 hours. Although other factors such as spalling, sintering and bond coat oxidation may affect the suitability of a thermal barrier coating under operating conditions at temperatures above 1200° C., the suitability of a specific thermal barrier coating can be roughly predicted by the performance of the corresponding zirconia powder in the aging test described below. In the examples, the terms "stabilizer" and "stabilizing oxide" refer to 100% yttria, 100% scandia or a combination of yttria and scandia. All parts are by mole-percent unless otherwise specified.

To determine the ability of specific scandia and/or yttria stabilized zirconia ceramic compositions to maintain the tetragonal (t') phase and to not undergo tetragonal-to-monoclinic phase transitions at temperatures above 1200° C., the specific scandia and/or yttria stabilized zirconia powders are prepared and examined by X-ray diffraction. The powders are then aged at 1400° C. for 140 hours and examined by X-ray diffraction. The high temperature phase stability is determined by estimating the relative amount of monoclinic (m) phase that is formed, using the following simplified peak height ratio formula:

$$\% \text{ destabilization} = \% \text{ monoclinic} = 100 \times \frac{m(11\bar{1})}{m(11\bar{1}) + t(111)} \quad (1)$$

where $m(11\bar{1})$ represents the peak height of the $m(11\bar{1})$ peak and $t(111)$ is the peak height of the tetragonal $t(111)$ peak. The actual numeric calculation of the monoclinic percent is more complex than the above formula, but the above formula is sufficient to show the relative amount of the monoclinic phase formed when comparing two or more powders. A more exact method of calculation of monoclinic volume percent is found in H. Toraya, H. Yoshimura and S. Somiya, J. Am. Ceram. Soc., 67 (1984) C183, incorporated herein by reference. The calculated results using the above formula for specific powders that are aged at 1400° C. for 140 hours are reasonably predictive of the relative long-term behavior of composite structures having a thermal barrier coating of powders of the same composition that are exposed to temperatures above 1200° C.

EXAMPLES

Example 1

Sol-gel preparation of a scandia-yttria stabilized powder

The following example illustrates the preparation of a scandia, yttria- stabilized zirconia powder that can be used to make a thermal barrier coating on a substrate in accordance with the present invention:

To prepare 100 g of scandia, yttria- stabilized zirconia $(Sc_2O_3)_{0.0595}(Y_2O_3)_{0.0105}(ZrO_2)_{0.93}$, 6.556 g of $Sc_2O_3$ in the form of 1.8 molar scandium nitrate aqueous solution and 1.894 g $Y_2O_3$ in the form of a 1.8 molar yttrium nitrate solution is added with stirring to a zirconia aquo-sol containing 91.55 g of $ZrO_2$ to form a feed mixture. The zirconia aquo-sol is prepared by adding an appropriate amount of zirconium basic carbonate (the amount added will vary according to the zirconium content of the zirconium basic carbonate) to 8 molar nitric acid in the proportion of 1 mole nitric acid to 1 mole zirconium. In a baffled vessel, 2.5 g of Span 80®surfactant is added to 500 ml of trichloroethylene and stirred. To this mixture, the feed mixture described above is added while stirring. The combined mixture is sparged with ammonia gas, while stirring, over a 20 minute period until the pH reaches about 8.5 and spherical gel particles are formed. The particles are separated by filtration or by decanting, dried, and then heated for 2 hours at 850°-900° C., forming plasma spray particles with a mean diameter of about 50 μm.

Example 2

Preparation and aging of a series of scandia and/or yttria stabilized powders A series of seven scandia and/or yttria stabilized zirconia powders was prepared by the sol-gel process described above, wherein the total concentration of stabilizing oxide was held at 7 wt % and the amount of $Sc_2O_3$ was varied from 0 to 100% mole-percent of the stabilizer (the percent of yttria is 100 minus the percent of scandia). The composition of each powder was determined by inductively coupled plasma emission spectroscopy (Dirats Laboratories, Westfield, Mass.). The compositions, designated as Series 1, are set forth in table 1, below.

TABLE 1

Series 1 Scandia and/or Yttria Stabilized Zirconia Powders

| Powder Number: | Coposition (mol %): | | | | Relative molar amount of $Sc_2O_3$ and $Y_2O_3$: | | Total molar percent: $Y_2O_3$ + $Sc_2O_3$: |
|---|---|---|---|---|---|---|---|
| | $ZrO_2$: | $HfO_2$: | $Y_2O_3$: | $Sc_2O_3$: | $Sc_2O_3$: | $Y_2O_3$: | |
| 1-1 | 94.9 | 1.20 | 3.90 | 0.0 | 0.0 | 100.0 | 3.90 |
| 1-2 | 94.7 | 1.33 | 3.37 | 0.63 | 15.8 | 84.2 | 4.00 |
| 1-3 | 94.3 | 1.35 | 2.80 | 1.55 | 35.6 | 64.4 | 4.35 |
| 1-4 | 93.8 | 1.33 | 1.88 | 2.94 | 61.0 | 39.0 | 4.82 |
| 1-5 | 93.0 | 1.31 | 0.93 | 4.78 | 83.7 | 16.3 | 5.71 |
| 1-6 | 92.7 | 1.33 | 0.37 | 5.63 | 93.8 | 6.2 | 6.00 |
| 1-7 | 92.8 | 1.29 | 0.0 | 5.90 | 100.0 | 0.0 | 5.90 |

The powder compositions also included the trace materials $SiO_2$, $TiO_2$, $Al_2O_3$, MgO, CaO, $Fe_2O_3$, U, Th and $Na_2O$, all below about 0.05 wt %. Powders 1—1 and 1-7 are not within the scope of the present invention because they do not contain both yttria and scandia. They are included for comparison.

The scandia and/or yttria stabilized zirconia powders were examined by X-ray diffraction using Cu radiation in a Norelco Type 12045 X-ray diffractometer fitted with a graphite-crystal monochromator. The scandia and/or yttria stabilized zirconia powders were heated (aged) in alumina boats at 1400° C. for 140 hours and cooled overnight in the furnace at cooling rates of slower than 10° C. min$^{-1}$. The aged powders were examined by X-ray diffraction and the percent of destabilization was calculated using the above formula (1). The trend of monoclinic formation as a function of the percent of scandia in the stabilizer is shown in FIG. 1, for both powders as prepared and powders that were aged at 1400° C. for 140 hours. As shown in FIG. 1, the amount of monoclinic formation in aged powders was greatest for Powder 1—1 (100% $Y_2O_3$, 0.0% $SC_2O_3$ in the stabilizer) and decreased essentially linearly down to Powder 1-6 (6.2% $Y_2O_3$, 93.8% $Sc_2O_3$ in the stabilizer), but then increased with Powder 1-7 (0.0% $Y_2O_3$, 100.0% $Sc_2O_3$ in the stabilizer). Thus, FIG. 1 clearly shows the surprising result that the high temperature tetragonal (t') stability of zirconia is improved by stabilizer mixtures that include both $Sc_2O_3$ and $Y_2O_3$, and that the stability of zirconia stabilized with both yttria and scandia, with a relative yttria content of about 1–70%, is greater than that of zirconia stabilized with yttria alone or scandia alone. The greatest improvement occurs with stabilizers containing a relatively greater amount of $Sc_2O_3$ and a relatively smaller amount of $Y_2O_3$ (for example, 6.2% $Y_2O_3$, 93.8% $Sc_2O_3$ in the stabilizer).

FIGS. 2 (a)–(d) are the X-ray diffraction spectra from the 27°–35° 2θ region for several of the Series 1 scandia- and yttria-stabilized powders after treatment at 1400° C. for 140 hours, showing the trend in t'phase stability as the relative amount of $Y_2O_3$ is decreased. FIGS. 2(a), 2(b), 2(c), and 2(d) correspond to powders 1—1, 1-3, 1-6 and 1-7 respectively. The X-ray diffraction spectrum for Powder 1—1 (FIG. 2a) (100% yttria in the stabilizer) shows the presence of only the cubic and monoclinic phases. On the other hand, the X-ray diffraction spectrum for Powder 1-6 (FIG. 2c) (6.2% $Y_2O_3$, 93.8% $Sc_2O_3$ in the stabilizer) shows the tetragonal t(002) and t(200,020) peak splitting, suggesting that $Sc_2O_3$-$Y_2O_3$ stabilizer mixtures preserve the t' structure at high temperatures. A comparison of the X-ray spectra of Powder 1-6 (FIG. 2c) (6.2% $Y_2O_3$, 93.8% $Sc_2O_3$ in the stabilizer) and Powder 1-7 (FIG. 2d) (0.0% $Y_2O_3$, 100.0% $Sc_2O_3$ in the stabilizer) suggests that $Sc_2O_3$-$Y_2O_3$ stabilizer mixtures yield higher crystallinity, as reflected by sharper X-ray peaks, than does 100% $SC_2O_3$.

Example 3

Preparation and aging of a second series of scandia and/or yttria stabilized powders A second series of seven scandia and/or yttria stabilized zirconia powders was prepared by the sol-gel process described above, wherein the total concentration of stabilizing oxide was held at 7 mol % and the amount of $Sc_2O_3$ was varied from 80 to 100% mole-percent of the stabilizer (the percent of yttria is 100 minus the percent of scandia). As before, the composition of each powder was determined by inductively coupled plasma emission spectroscopy (Dirats Laboratories, Westfield, Mass.). The compositions, designated as Series 2, are set forth in table 2, below.

TABLE 2

Series 2 Scandia and/or Yttria Stabilized Zirconia Powders

| Powder Number: | Coposition (mol %): | | | | Relative molar amount of $Sc_2O_3$ and $Y_2O_3$: | | Total molar percent: $Y_2O_3$ + |
|---|---|---|---|---|---|---|---|
| | $ZrO_2$: | $HfO_2$: | $Y_2O_3$: | $Sc_2O_3$: | $Sc_2O_3$: | $Y_2O_3$: | $Sc_2O_3$: |
| 2-1 | 91.75 | 0.90 | 0.0 | 7.35 | 100.0 | 0.0 | 7.35 |
| 2-2 | 92.22 | 0.95 | 0.17 | 6.66 | 97.5 | 2.5 | 6.83 |
| 2-3 | 92.38 | 0.97 | 0.34 | 6.31 | 94.9 | 5.1 | 6.65 |
| 2-4 | 92.14 | 0.95 | 0.66 | 6.24 | 90.4 | 9.6 | 6.90 |
| 2-5 | 92.26 | 0.96 | 1.36 | 5.42 | 79.9 | 21.1 | 6.78 |

The powder compositions also included the trace materials $SiO_2$, $TiO_2$, $Al_2O_3$, MgO, CaO, $Fe_2O_3$, U, Th and $Na_2O$, all below about 0.05 wt %. Powder 2-1 is not within the scope of the present invention because it does not contain both scandia and yttria. It is included for comparison.

The Series 2 powders were heated for 140 hours at 1400° C. in the same manner as the Series 1 powders described in Example 2 and were examined by X-ray diffraction. The X-ray diffraction spectra are shown in FIG. 3(a)–3(e). FIGS. 3(a), 3(b), 3(c), 3(d), and 3(e) correspond to powders 2-5, 2-4, 2-3, 2-2, and 2-1 respectively. The X-ray diffraction spectra show very minimal monoclinic formation for Powder 2-4 (FIG. 3(b)) (9.6% $Y_2O_3$, 90.4% $Sc_2O_3$ in the stabilizer) and Powder 2-5 (FIG. 3(a)) (21.1% $Y_2O_3$, 79.9% $Sc_2O_3$ in the stabilizer) and no discernable monoclinic formation for Powder 2-3 (FIG. 3(c))(5.1% $Y_2O_3$, 94.9% $Sc_2O_3$ in the stabilizer). The X-ray spectrum for Powder 2-1 (FIG. 3(e)) (0.0% $Y_2O_3$, 100.0% $Sc_2O_3$ in the stabilizer), on the other hand, shows discernable monoclinic formation and also shows signs of other phases (the t(111) peak is significantly broader than t(111) peaks of the other spectra)

Example 4

Preparation and aging of a scandia and/or yttria stabilized powder

Figure 5:
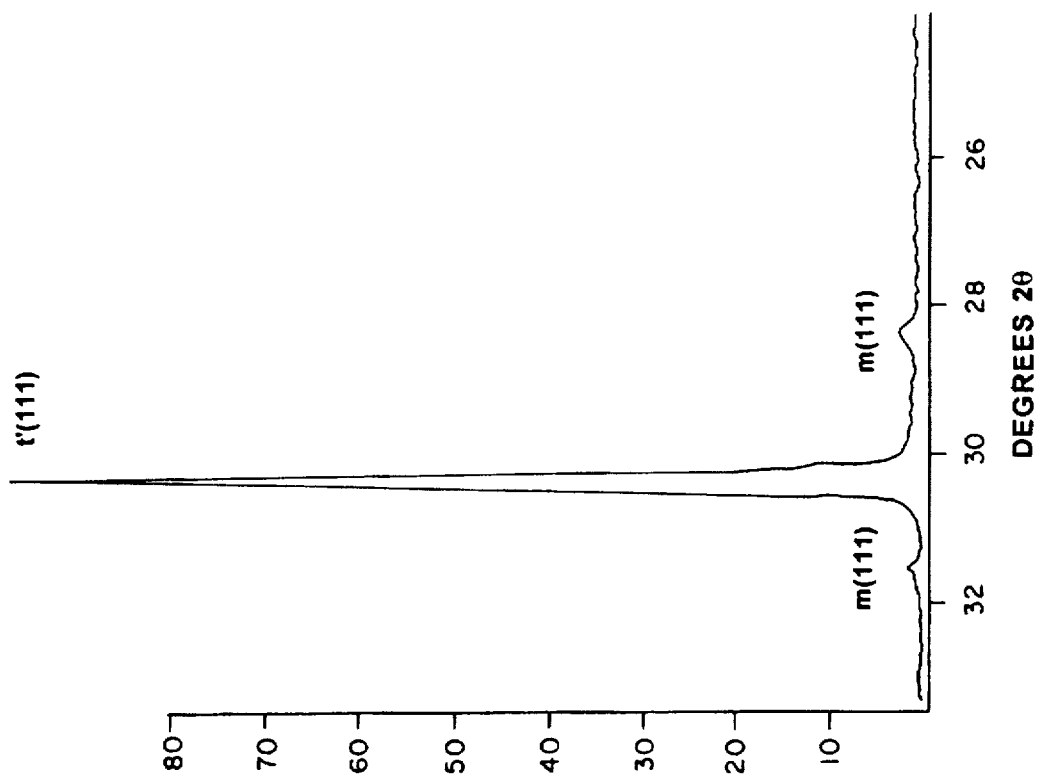
FIG. 5 is an X-ray diffraction spectrum from the 33°–27° 2θ region for a scandia, yttria-stabilized powder (same composition as in FIG. 4) after heating at 1400° C. for 500 hours.
Figure 4:
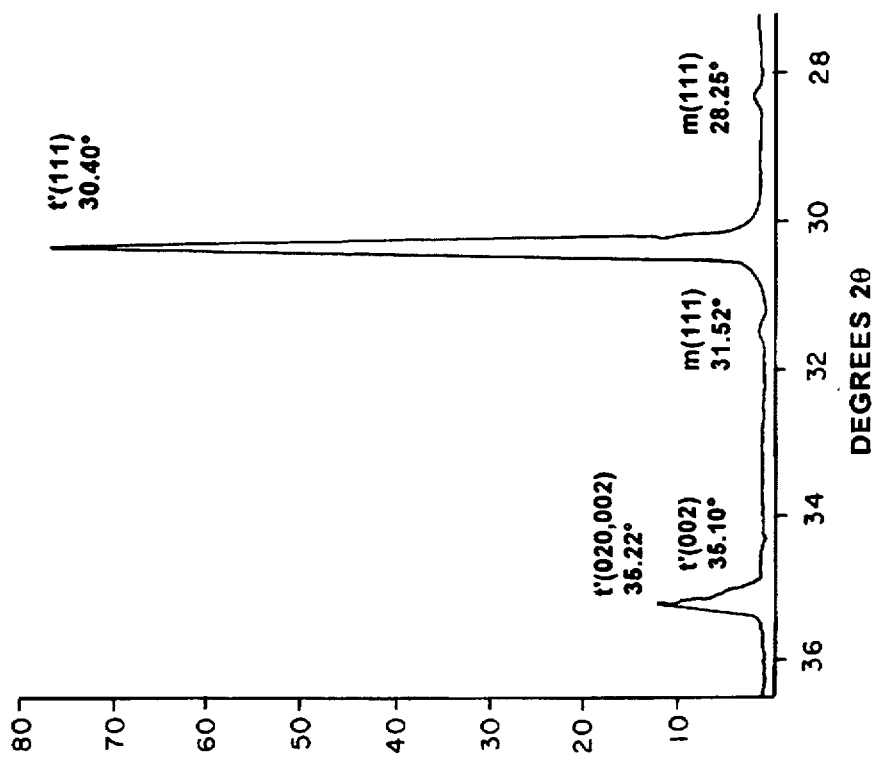
FIG. 4 is an X-ray diffraction sprectrum from the 36°–27° 2θ region for a scandia, yttri-stabilized powder (13.3% $Y_2O_3$, 86.7% $Sc_2O_3$ in the stabilizer, and the stabilizer makes up 7.5% of the scandia, yttria- stabilized zirconia) after heating at 1400° C. for 141 hours.
Figure 6:
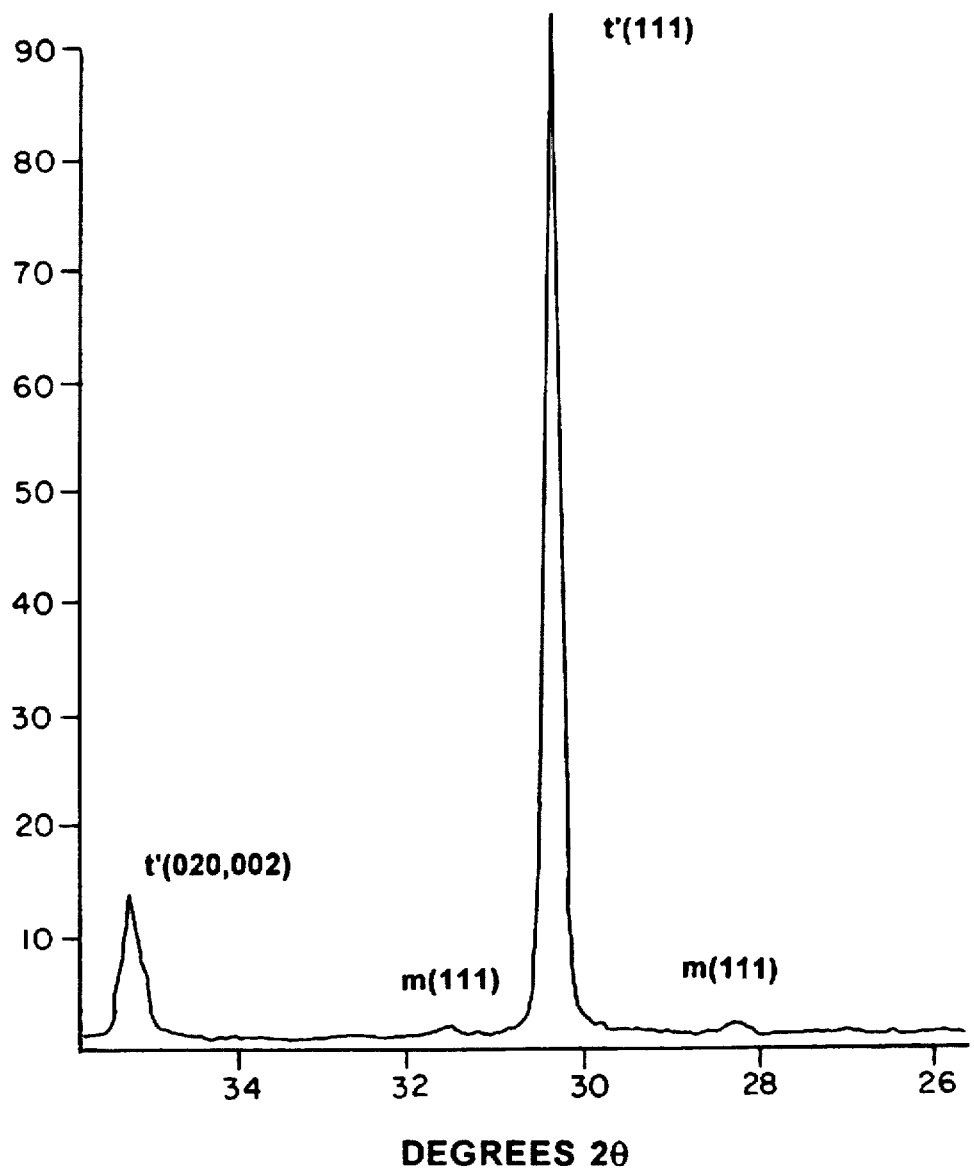
FIG. 6 is an X-ray diffraction spectrum from the 36°–26° 2θ region for a scandia, yttria-stabilized powder (same composition as in FIG. 4) after heating at 1400° C. for 1500 hours.

A scandia, yttria- stabilized zirconia powder was prepared by the sol-gel process described above, wherein the total concentration of stabilizer was 7.5 mol % of the zirconia powder and the stabilizer contained 13.3% $Y_2O_3$ and 86.7% $Sc_2O_3$. Samples of the powder were heated for 141, for 500 and for 1500 hours at 1400° C. and were examined by X-ray diffraction. The X-ray diffraction spectra are shown in FIG. 4, 5 and 6. The X-ray diffraction spectra show very minimal monoclinic formation, indicating very little degradation of the tetragonal phase. Even more importantly, there is no significant change in the X-ray spectra between 141 hours and 1500 hours, indicating that there is no progressive degradation taking place. Heating a sample zirconia composition for 1500 hours at 1400° C. is a very severe test of phase stability, and the absence of significant monoclinic formation for the scandia, yttria- stabilized zirconia powder after 1500 hours and the lack of significant change in the phase composition between 141 hours and 1500 hours strongly indicate that long-term ultra-high temperature stability has been achieved.

Obviously, many modifications and variations of the present invention are possible in light of the above teachings. It is therefore to be understood that, within the scope of the appended claims, the invention may be practiced otherwise than as specifically described.

What is claimed is:

1. A composite structure comprising a self-supporting substrate and a thermal barrier coating on said substrate, said thermal barrier coating including zirconia stabilized with scandia and yttria, wherein the combined amount of scandia and yttria in the thermal barrier coating is about 4–10 mole-percent of the thermal barrier coating and wherein the amount of yttria is about 1–70 mole-percent of the combined amount of scandia and yttria.

2. The composite structure of claim 1 wherein the amount of yttria is about 5–20 mole-percent of the combined amount of scandia and yttria.

3. The composite structure of claim 1 wherein the combined amount of scandia and yttria in the thermal barrier coating is about 6–8 mole-percent of the thermal barrier coating and wherein the amount of yttria is about 5–15 mole-percent of the combined amount of scandia and yttria.

4. The composite structure of claim 1 wherein at least about 90% by volume of the zirconia is in the t'phase.

5. A composite structure comprising a self-supporting substrate and a thermal barrier coating on said substrate, said thermal barrier coating including zirconia stabilized with scandia and yttria, wherein the combined amount of scandia and yttria in the thermal barrier coating is about 6–8 mole-percent of the thermal barrier coating, wherein the amount of yttria is about 5–15 mole-percent of the combined amount of scandia and yttria, and wherein at least about 90% by volume of the zirconia is in the t'phase.

6. A composite structure comprising a self-supporting substrate and a thermal barrier coating on the substrate, wherein the composite structure is made by a process comprising the steps of forming a scandia, yttria-stabilized zirconia ceramic wherein the combined amount of scandia and yttria in the ceramic is about 4–10 mole-percent of the ceramic and wherein the amount of yttria is about 1–70 mole-percent of the combined amount of scandia and yttria, and applying the ceramic to the self-supporting substrate to form the thermal barrier coating thereon.

7. The composite structure of claim 6 wherein the amount of yttria is about 5–20 mole-percent of the combined amount of scandia and yttria.

8. The composite structure of claim 6 wherein the combined amount of scandia and yttria in the ceramic is about 6–8 mole-percent of the ceramic and wherein the amount of yttria is about 5–15 mole-percent of the combined amount of scandia and yttria.

9. A composite structure comprising a self-supporting substrate and a thermal barrier coating on the substrate, wherein the composite structure is made by a process comprising the steps of forming a scandia, yttria-stabilized zirconia ceramic, and applying the ceramic to the self-supporting substrate to form the thermal barrier coating thereon, and wherein the amount of scandia and yttria in the ceramic is an effective amount to stabilize the ceramic so that at least 90% by volume of the ceramic remains in the tetragonal (t') phase when the thermal barrier coating is exposed to temperatures above 1200° C.

* * * * *